US010104543B2

(12) United States Patent
Gunasekara et al.

(10) Patent No.: US 10,104,543 B2
(45) Date of Patent: Oct. 16, 2018

(54) PROTECTION AGAINST ILLEGITIMATE LINK TERMINATION IN A WIRELESS NETWORK

(71) Applicants: Don Gunasekara, Reston, VA (US); Harriet DuBois, Herndon, VA (US); Kevin Caldwell, Vienna, VA (US); Laxman Nallani, Herndon, VA (US)

(72) Inventors: Don Gunasekara, Reston, VA (US); Harriet DuBois, Herndon, VA (US); Kevin Caldwell, Vienna, VA (US); Laxman Nallani, Herndon, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 614 days.

(21) Appl. No.: 13/793,421

(22) Filed: Mar. 11, 2013

(65) Prior Publication Data

US 2014/0259102 A1 Sep. 11, 2014

(51) Int. Cl.

| | |
|---|---|
| *H04L 29/06* | (2006.01) |
| *H04W 12/06* | (2009.01) |
| *H04W 76/30* | (2018.01) |
| *H04W 12/08* | (2009.01) |
| *H04W 76/10* | (2018.01) |
| *H04W 84/12* | (2009.01) |

(52) U.S. Cl.
CPC .......... *H04W 12/06* (2013.01); *H04W 12/08* (2013.01); *H04W 76/30* (2018.02); *H04L 63/0876* (2013.01); *H04L 63/18* (2013.01); *H04W 76/10* (2018.02); *H04W 84/12* (2013.01)

(58) Field of Classification Search
CPC ..... H04W 12/04; H04W 12/12; H04W 12/06; H04W 12/08; H04W 76/06; H04W 76/02; H04W 63/0876; H04W 63/18; H04W 84/12; H04W 76/10; H04W 76/30; H04L 63/08; H04L 67/306; H04L 63/0876; H04L 63/18; G06F 21/6218
See application file for complete search history.

(56) References Cited

U.S. PATENT DOCUMENTS

| | | | |
|---|---|---|---|
| 8,340,711 B1 * | 12/2012 | Glass et al. ................. | 455/552.1 |
| 2004/0243846 A1 * | 12/2004 | Aboba et al. ................. | 713/201 |
| 2008/0066157 A1 * | 3/2008 | Stevens et al. ................. | 726/4 |

(Continued)

*Primary Examiner* — Ghodrat Jamshidi
(74) *Attorney, Agent, or Firm* — Armis IP Law, LLC

(57) ABSTRACT

A wireless access point may be openly accessible to public use. The wireless access point receives an association communication from a computer device to establish a wireless communication link with the wireless access point. The association communication can includes unique information such as vendor specific information associated with a network interface card in the computer device, an IP (Internet Protocol) network address assigned to the computer device, etc. The wireless access point establishes a wireless communication link between the wireless access point and the computer device. The wireless access point utilizes the unique information to verify authenticity of the request to terminate the wireless communication link. In a similar vein, a computer device can receive unique information associated with a wireless access point and use the unique information to verify authenticity of a request by the access point to terminate the wireless communication link.

26 Claims, 10 Drawing Sheets

(56) References Cited

U.S. PATENT DOCUMENTS

2008/0295144 A1* 11/2008 Cam-Winget .......... H04L 63/08
                                                       726/1
2009/0052362 A1*  2/2009 Meier et al. .................. 370/311
2011/0085447 A1*  4/2011 Kholaif et al. ............... 370/242
2012/0051346 A1*  3/2012 Herbert et al. ............... 370/338

* cited by examiner

PROTECTION AGAINST ILLEGITIMATE LINK TERMINATION IN A WIRELESS NETWORK

BACKGROUND

Conventional computer devices typically have the ability to identify a presence of WiFi™ access points. For example, according to current technology, to learn of one or more access points in a region, a computer device can transmit a wireless query signal (e.g., a probe request). In response to the wireless signal, any of one or more active WiFi™ network access points in the region will respond with information indicating their identities. Accordingly, via the response information from the access points, the operator of the computer can identify which, if any, WiFi™ networks are available for use in the region.

After identifying publicly available WiFi™ networks, the computer device can initiate display of the identities of the different WiFi™ networks on a display screen. In such an instance, the user of the computer can manually select from a listing of the available WiFi™ networks in which to connect.

If the WiFi™ access point is an open WiFi™ network, the user will not need to provide password to be granted access to the Internet through the selected WiFi™ access point.

A downside of open networks is that illegitimate users (a.k.a., hackers) can eavesdrop on respective wireless communications between a computer device and a respective WiFi™ access point. Via eavesdropping, an illegitimate user may be able to learn of a respective network address associated with the computer device. Using the network address, the illegitimate user may be able to control use of the communication link between the computer device and the access point.

BRIEF DESCRIPTION OF EMBODIMENTS

Conventional use of WiFi™ suffers from a number of deficiencies. For example, conventional use of open WiFi™ access points to obtain Internet access is prone to denial of service attacks.

As a specific example, an illegitimate user can eavesdrop on a respective communication link to learn of a MAC (Media Access Control) address assigned to a respective computer device communicating with the access point. The illegitimate user obtaining the MAC address can then transmit a link termination message. The link termination message can be a de-authentication message or disassociation message including the MAC address of the legitimate user to the access point. Upon receipt, the access point checks the MAC address of the received de-authentication message or dissociation message and assumes that the message was received from the respective computer device and terminates the respective communication link. Accordingly, the illegitimate user can deny use of services by the legitimate user.

Additionally, an illegitimate user can obtain a MAC address of the access point. To deny use of open services by a user, the illegitimate user encodes a denial of service message (e.g., a disassociation or de-authentication message) to include a MAC address of the access point. The illegitimate user then transmits the (denial of service) message to the user. The user assumes that the access point generated the message to terminate the respective wireless communication link and discontinues use of the wireless communication link.

Embodiments herein deviate with respect to conventional techniques. For example, one embodiment herein is directed to reducing disruption of services in a wireless network caused by illegitimate denial of service attacks.

More specifically, a wireless access point is openly accessible to public use. The wireless access point receives an association communication from a computer device to establish a wireless communication link with the wireless access point. By way of a non-limiting example, the association communication can include unique information such as vendor specific information associated with a network interface card in the computer device, an IP (Internet Protocol) network address assigned to the computer device, etc. The wireless access point establishes a wireless communication link between the wireless access point and the computer device. The wireless access point utilizes the unique information to verify authenticity of the request to terminate the wireless communication link.

In a more specific embodiment, use of the unique information to verify authenticity of the link termination request can include receiving a message from a resource communicating with the wireless access point. The message can indicate to terminate the wireless communication link. The message purports to be sent from the computer device to the wireless access point. To verify authenticity of the received termination message, the wireless access point communicates a challenge message to the resource. The challenge message requests the resource to provide a copy of the unique information (such as unique information received during association) associated with the computer device.

The wireless access point conditionally terminates the wireless communication link with a respective computer device depending on whether the resource provides the appropriate information in the challenge response. For example, in one embodiment, the wireless access point receives a challenge response from the resource. The resource generates the challenge response in response to receiving the challenge message. At the access point, in response to detecting that the challenge response from the resource (which may be the computer device with which the communication link is made or an illegitimate resource) includes the copy of the unique information associated with the computer device, it is assumed that the computer device legitimately sent the message and the wireless access point grants the request to terminate the wireless communication link. In such an instance, by way of a non-limiting example, the wireless access point transmits a notification to the computer device. The notification indicates that the request to terminate has been granted.

Alternatively, the resource (attempting to terminate the wireless communication link) may not provide an appropriate copy of the unique information associated with the computer device. In such an instance, it can be assumed that because the resource does not provide the appropriate unique information associated with the computer device that the resource is not the computer device and is potentially an illegitimate user trying to deny wireless service to the legitimate user of computer device. In this instance, the wireless access point transmits a notification to the resource indicating that the request to terminate has been denied.

Further embodiments herein can include a computer device configured to protect against denial of service attacks. For example, a computer device can be configured to communicate over a wireless communication link with an open wireless access point. Prior to an occurrence of a denial of service attack, the computer device can receive unique information associated with the wireless access point. The computer device stores the unique information in a repository accessible to the computer device. In this example embodiment, during a denial of service attack, the computer device utilizes the previously stored unique information of the wireless access point to verify authenticity of a request to terminate the wireless communication link.

More specifically, assume that the computer device receives a message from a resource purporting to be the wireless access point with which the computer device is connected via a wireless communication link. The received message includes the request to terminate the wireless communication link. To verify the authenticity of the request to terminate, in response to the request to terminate, the computer device communicates a challenge message to the requesting resource. The challenge message includes a request to the resource to provide a copy of specific unique information associated with the wireless access point. The computer device receives a challenge response from the resource. In response to detecting that the challenge response includes the copy of the unique information associated with the wireless access point, the computer device grants the request (or generates an acknowledgment of the termination) to terminate the wireless communication link. In such an instance, the computer device transmits a notification to the resource. The notification indicates that the request to terminate has been granted.

Alternatively, if the computer device does not receive a copy of the unique information associated with the wireless access point, the computer device transmits a notification (to the resource) indicating that the request to terminate has been denied.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by a processor of a respective computer device, cause the processor or multiple processors of the system to: at a wireless access point openly accessible to public use, receive an association communication from a computer device to establish a wireless communication link with the wireless access point, the association communication including unique information associated with the computer device; establish the wireless communication link between the wireless access point and the computer device; and utilize the unique information to verify authenticity of a subsequent request to terminate the wireless communication link.

Yet another embodiments herein includes a method and computer readable storage medium and/or system having instructions stored thereon. The instructions, when executed by a processor of a respective computer device, cause the processor or multiple processors of the system to: establish a wireless communication link between a wireless access point and a computer device; and at the wireless access point: i) retrieve unique information associated with the computer device; ii) utilize the unique information to verify authenticity of a subsequent request to terminate the wireless communication link.

Still yet another embodiment herein includes a computer readable storage medium and/or system having instructions stored thereon. Such instructions, when executed by a processor of a respective computer device, cause the processor or multiple processors of the system to: at a computer device communicating with an open wireless access point: receive a network address of the wireless access point; retrieve unique information associated with the wireless access point; and utilize the unique information to verify authenticity of a request to terminate the wireless communication link.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for reducing denial of service attacks. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques.

For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Figure 1:
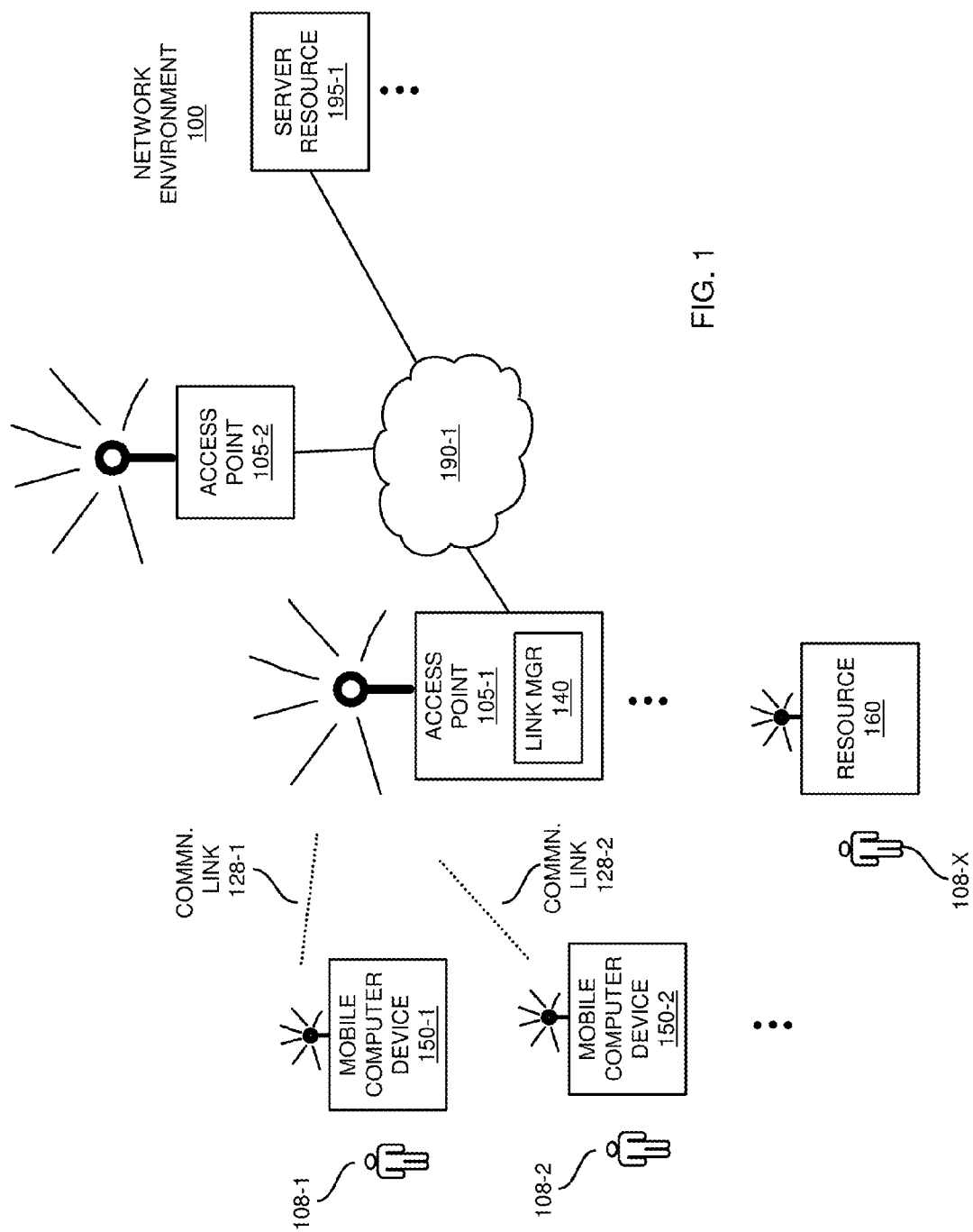
FIG. 1 is an example diagram illustrating a network environment according to embodiments herein.

Now, more specifically, FIG. 1 is an example diagram illustrating a network environment according to embodiments herein.

As shown, network environment 100 includes multiple computer devices 150 (e.g., computer device 150-1, computer device 150-2, etc.), multiple wireless access points 105 (e.g., access point 105-1, access point 105-2, . . . ), network 190-1, server resource 195-1, etc.

Each access point can be and/or include a computer device. By way of a non-limiting example, the computer device 150-1 can be a first computer device; the wireless access point 105-1 can be a second computer device.

In one embodiment, a respective legitimate user operates each of the computer devices 150. For example, legitimate user 108-1 operates computer device 150-1; legitimate user 108-2 operates computer device 150-2; etc.

Network environment 100 may include resource 160 such as a computer device operated by an illegitimate user 108-X. User 108-X may operate the resource 160 to deny use of one or more wireless services to computer devices 150 by generating link termination messages to the access point 105-1 or generating link termination messages to computer devices 150.

For example, in one instance, the resource 160 may acquire (such as via eavesdropping or other unscrupulous method) a unique network address of the computer device 150-1. To terminate wireless communication link 128-1, the resource 160 may generate and transmit a termination message to access point 105-1. In one instance, the resource 160 generates the termination message to include the network address of the computer device 150-1 so that it appears to the access point 105-1 that the computer device 150-1 generated and transmitted the termination message to the access point 105-1 to terminate the wireless communication link 128-1.

In another instance, the resource 160 may acquire (such as via eavesdropping or other unscrupulous method) a network address of the access point 105-1. To terminate wireless communication link 128-1, the resource 160 may generate and transmit a termination message to computer device 150-1. The resource 160 can generate the termination message to include the network address of the access point 105-1 so that it appears to the computer device 150-1 that the access point 105-1 generated and transmitted the termination message to the computer device 150-1 to terminate the wireless communication link 128-1.

Each of computer devices 150 can be stationary or mobile. Computer devices 150 utilize access points 105 as a means to connect to a respective network such as the Internet. Each of access points 105 can be WiFi™ access points or wireless base stations configured to support wireless communications such as those according to a WiFi™ protocol such as 802.11 or any other suitable wireless communication protocol. By way of a non-limiting example, communication links 128 can be WiFi™ wireless communication links or any other suitable type of communication links.

In one embodiment, the access points 105 are open WiFi™ networks in which any of multiple public computer users can attempt to establish a network connection to obtain access to core network and a network such as the Internet.

Subsequent to establishing a wireless communication link 128-1, via communications over wireless communication link 128-1, through network 190-1 (such as a core service provider network, Internet, etc.), the computer device 150-1 is able to retrieve content from different sources such as server resource 195-1. As mentioned, by way of a non-limiting example, network 190-1 can include and/or provide access to the Internet.

Figure 2:
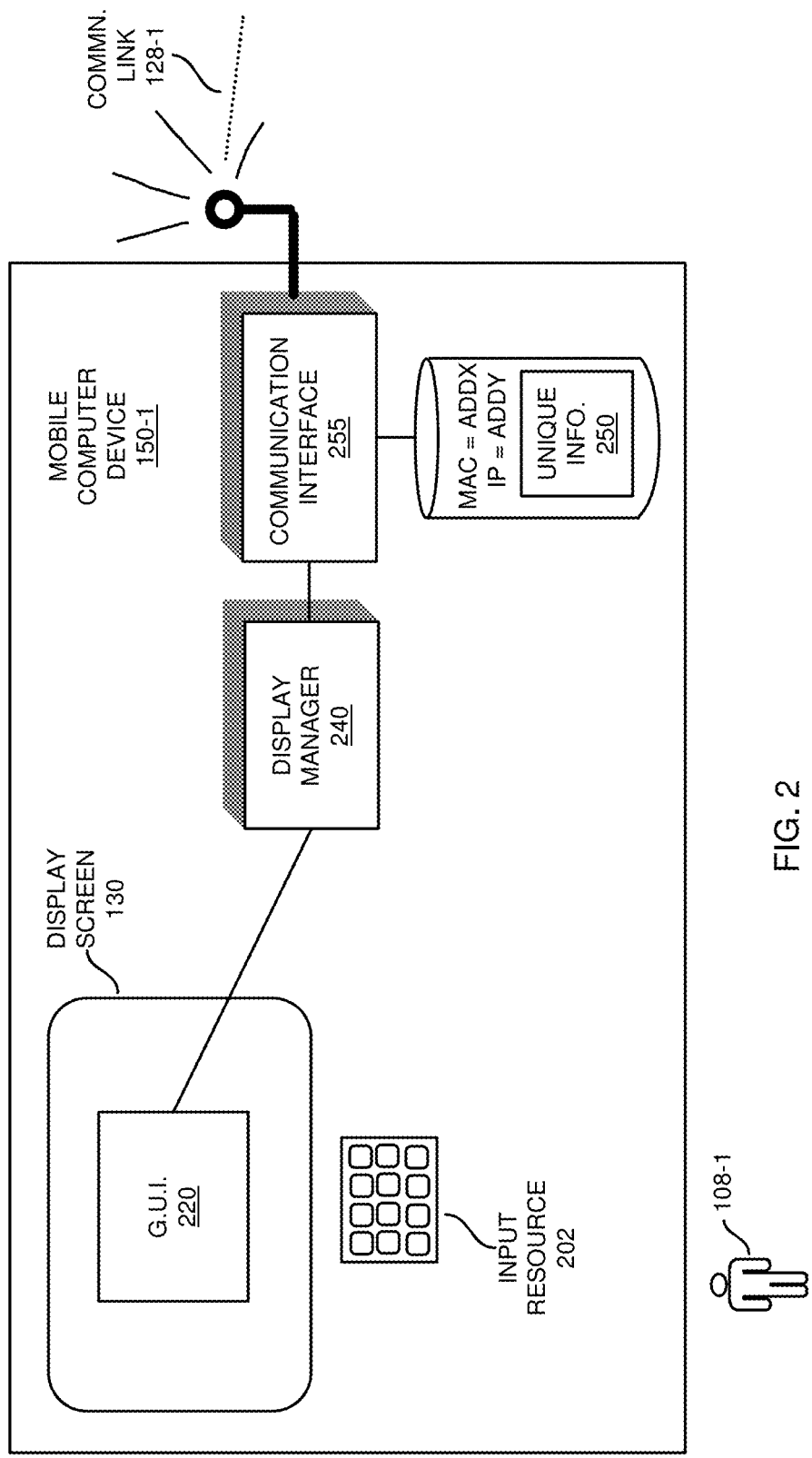
FIG. 2 is an example diagram illustrating a computer device configured to communicate over a wireless access point according to embodiments herein.

FIG. 2 is an example diagram illustrating a computer device configured to connect to and communicate through an wireless access point according to embodiments herein.

As shown, the computer device 150-1 (e.g., any type of computer device) used by a respective user 108-1 can include appropriate hardware and software supporting functions such as communicating through a respective access point in network environment 100 to retrieve content and display retrieved content on a display screen 130.

As a specific example, user 108-1 provides input to the computer device 150-1 via input resources 202. Input resources 202 can include a keyboard, touch-screen interface, microphone, computer mouse, mouse pad, etc., enabling the user 108-1 to control operations of computer device 150-1.

Assume in this example that the user 108-1 provides input to launch a respective graphical user interface 220 (such as a browser) for display on display screen 130. Launching of the graphical user interface 220 can include execution of respective computer code to establish a respective wireless communication link between the computer device 150-1 and the access point 105-1 as discussed herein.

Display manager 240 of computer device 150-1 initiates display of the graphical user interface 220 and corresponding images on display screen 130-1.

Computer device 150-1 includes communication interface 255. In accordance with input to the graphical user interface 220 from user 108-1, the display manager 240 initiates retrieval of requested content via communications through communication interface 255 over wireless communication link 128-1 to access point 105-1. Access point 105-1 communicates over network 190-1 to retrieve the requested content on behalf of the computer device 150-1.

Subsequent to transmitting a respective content request over communication link 128-1, communication interface 255 receives requested content over wireless communication link 128-1 from access point 105-1. Display manager 240 initiates playback of the retrieved content (e.g., images, audio, etc.) on display screen 130 for viewing by the respective user 108-1.

By further way of a non-limiting example, each of computer devices 150 can be any suitable resource such as a mobile communication device, phone, personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, etc.

As shown, by way of a non-limiting example, the computer device 150-1 is assigned a MAC address of ADD X and an IP address ADD Y. The IP address can be a static IP address or assigned in accordance with a protocol such as DHCP (Dynamic Host Configuration Protocol). The communication interface 255 uses such network address information to generate and transmit messages. For example, the messages transmitted over wireless communication link 128-1 can include a source address of ADD X and/or ADD Y. These unique network addresses are used for data routing purposes in a packet-switched network.

In addition to one or more unique addresses, the computer device 150-1 can include unique information 250. The unique information 250 can include any suitable information such as software version information, hardware version information, etc., associated with the computer device 150-1 and/or user 108-1.

Figure 3:
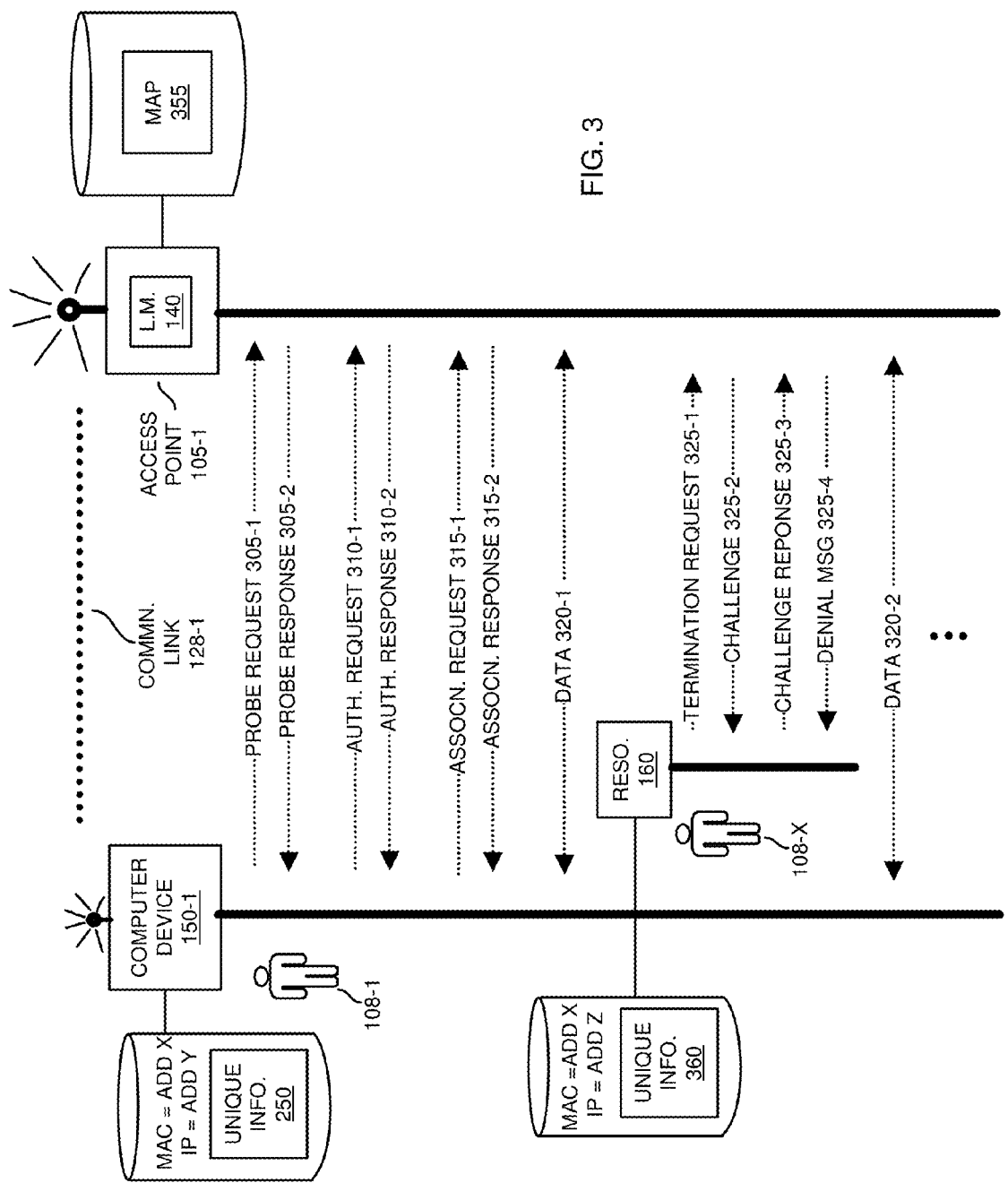
FIG. 3 is an example diagram illustrating communications to reduce occurrence of denial of service attacks according to embodiments herein.

FIG. 3 is an example diagram illustrating communications according to embodiments herein. Note that the ordering of the communications is shown by way of non-limiting example only and that the communications to reduce denial of service attacks can vary depending on the embodiment.

By way of a non-limiting example, to establish wireless communication link 128-1, the computer device 150-1 generates and transmits a respective probe request 305-1. The probe request 305-1 is a query to learn of one or more access points that may be within wireless range of the computer device 150-1.

Assume in this example embodiment that the link manager 140 of access point 150-1 receives the probe request 305-1 and responds to the computer device 150-1 with a probe response 305-2. In one embodiment, the probe response 305-2 includes a unique identifier value of the access point 105-1 such as an SSID (Service Set Identification).

In furtherance of establishing the wireless communication link 128-1, the computer device 150-1 generates and transmits a respective authentication request 310-1 to link manager 140 of access point 105-1. In an open WiFi™ network, the authentication request 310-1 indicates that the computer device 150-1 would like to establish a wireless communication link on which to communicate. In this example embodiment, the authentication request 310-1 indicates that the computer device 150-1 would like to establish a respective wireless communication link with the access point 105-1.

The link manager 140 of the access point 105-1 receives the authentication request 310-1. If appropriate resources are available to establish a wireless communication link, the access point 105-1 generates an authentication response 310-2 indicating that the request to establish the wireless communication link has been accepted. If no resources are available, the access point 105-1 may deny the request for establishing a wireless communication link.

To establish the wireless communication link 128-1, the computer device 150-1 establishes an association with the access point 105-1. By way of a non-limiting example, the association request 315-1 enables the link manager 140 in the access point 105-1 to allocate resources for and synchronize with a radio network interface card in the computer device 150-1. Via transmission of the association request 315-1, the computer device 150-1 begins the association process.

The association request 315-1 can include the identifier (e.g., SSID) of the access point 105-1 to which the computer device 150-1 would like to establish the wireless communication link. By further way of a non-limiting example, the association request 315-1 can include unique information 250 such as supported data rates, hardware model information, vendor software information, etc.

After receiving the association request 315-1, the access point 105-1 considers associating with the network interface card in the computer device 150-1. If accepted, the link manager 140 reserves memory space and establishes an association ID for the network interface card on the computer device 150-1.

The access point 105-1 then sends an association response 315-2 to the computer device 150-1. The association response 315-2 can include an acceptance or rejection notice to the network interface card in the computer device 150-1. If the access point 105-1 accepts the request for a connection, the association response 315-2 can include further information about the association such as supported wireless data transmission rates, an association identifier value, and/or other unique information associated with the access point 105-1.

In one non-limiting example embodiment, the link manager 140 of access point 105-1 produces map 355 to store information associated with the computer device 150-1 and/or wireless communication link 128-1. For example, during communications in furtherance of establishing the wireless communication link 128-1, the link manager 140 of access point 105-1 can receive information such as: the MAC network address (e.g., ADD X) of the computer device 150-1, the IP network address (e.g., ADD Y) assigned to the computer device 150-1 (the IP address may be static or assigned via DHCP), unique information 250 such as vendor specific information associated with the computer device 150-1, etc.

By way of a non-limiting example, for wireless communication link 128-1, the link manager 140 produces map 355 to include: the MAC address (ADD X) of the computer device 150-1; the IP address (ADD Y) assigned to the computer device 150-1; unique information 250 associated with the computer device 150-1, etc.

Assuming that the association is successful in the above communications and establishing the wireless communication link 128-1, the computer device 150-1 is now able to transmit and receive data 320-1 over established wireless communication link 128-1. In one embodiment, as mentioned above, the computer device operates a respective browser and retrieves content through the access point 105-1 via use of HTTP (Hypertext Transfer Protocol) or any other suitable communication protocol.

Embodiments herein can include access point 105-1, which is openly accessible to the public. The access point 105-1 receives unique information 250 associated with computer device 150-1 during association; the access point 105-1 obtains one or more unique network addresses assigned to the computer device 150-1.

In one embodiment, the access point 105-1 stores the one or more unique network address and respective unique information in a respective repository.

Figure 4:
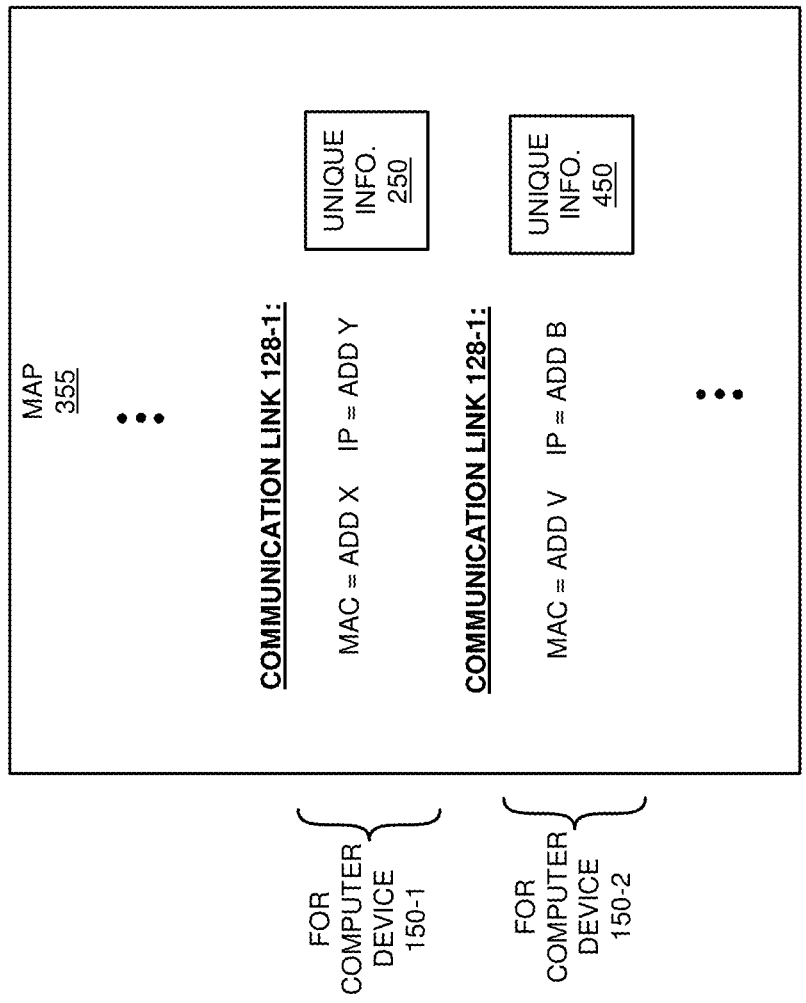
FIG. 4 is an example diagram illustrating a mapping of stored information according to embodiments herein.

For example, as shown in the example map 355 in FIG. 4, for computer device 150-1, the access point 105-1 produces a respective entry in map 355 indicating a mapping relationship between the MAC address of the computer device 150-1 (e.g., MAC ADD X and IP ADD Y) and the unique information 250. As further shown, for computer device 150-2, that the access point 105-1 creates an entry in map 355 indicating a mapping relationship between the MAC address of the computer device 150-2 (e.g., MAC ADD V and IP ADD B) and the unique information 450, and so on.

Referring again to FIG. 3, after establishment of the wireless communication link 128-1 between the wireless access point 105-1 and the computer device 150-1, assume in this example embodiment that the user 108-X and/or resource 160 attempts to maliciously terminate the wireless communication link 128-1 to disrupt communications between the computer device 150-1 and the access point 105-1.

In accordance with embodiments herein, the access point 105-1 utilizes any of one or more different types of unique information received from or associated with the computer device 150-1 and/or user 108-1 to verify authenticity of a subsequently received request to terminate the wireless communication link 128-1.

More specifically, assume that the resource has obtained a copy of the MAC address (e.g., ADD X) of the computer device 150-1. To terminate the communication link 128-1, the resource 160 generates termination request 325-1 to terminate the wireless communication link 128-1.

In one embodiment, the termination request 325-1 includes ADD X such that it appears to the access point 105-1 that the termination request 325-1 was generated and sent by the computer device 150-1, even though the termination request 325-1 was generated by the resource 160. The link manager 140 of access point 105-1 receives the termination request 325-1 from resource 160 purporting to be from the computer device 150-1.

By way of a non-limiting example, in response to receiving the termination request 325-1, the link manager 140 transmits a challenge 325-2 to the resource 160. Because the computer device 150-1 did not generate the termination request 325-1, the computer device 150-1 may ignore the challenge 325-2.

In one embodiment, the challenge 325-2 includes a request to provide unique information to the link manager 140 of access point 105-1. The challenge 325-2 may or may not specify the particular type of unique information that is being requested.

Assume in this example that the challenge request 325-2 includes a request for the resource 160 to provide a copy of unique information (e.g., vendor specific information or any other suitable information) associated with the sending resource 160.

The resource 160 receives the challenge 325-2. In response to the request for unique information as specified by the challenge 325-2, the resource 160 forwards a copy of the unique information 360 associated with resource 160 as the challenge response 325-3. Note that the unique information 360 associated with resource 160 is different than unique information 250 associated with computer device 150-1.

Using map 355, the link manager 140 maps a network address (e.g., ADD X) in the messaging received from the resource 160 purporting to be the computer device 150-1 to the unique information 250 stored in the repository (e.g., map 355). The link manager 140 obtains the requested challenge data (such as unique information 360) from the challenge response 325-3. The link manager 140 then compares the data (e.g., unique information 360) obtained from the challenge response 325-3 to the unique information 250 retrieved from the repository.

In this instance, based on the comparison, the link manager 140 detects that the resource 160 attempting to terminate the wireless communication link 128-1 is an illegitimate user or machine because the resource 160 was unable to provide the unique information 250 associated with the computer device 150-1. Accordingly, in response to detecting that the data (e.g., unique information 360) obtained from the challenge response is substantially different than the unique information 250 associated with computer device 150-1, the link manager 140 of the access point 105-1 denies the request to terminate the wireless communication link 128-1.

By way of a non-limiting example, the link manager 140 can be configured to generate and transmit the denial message 325-4 to resource 160 to indicate that the request to terminate has been discarded. The user 108-1 and computer device 150-1 are able to continue use of the wireless communication link 128-1 because the termination request has been denied.

As previously discussed, the unique information requested from a respective device can be any suitable information. In accordance with further embodiments, in response to receiving the termination request 325-1, the link manager 140 may request that the resource 160 provide other unique information such as an IP address assigned to the resource 160. In such an instance, the resource 160 would respond with the address value ADD Z. Since ADD Z in the received message (such as challenge response 325-3) from the resource 160 does not match the stored IP address (e.g., ADD Y) associated with the computer device 150-1, the link manager 140 denies the request to terminate the wireless communication link 128-1.

In accordance with yet further embodiments, note that the challenge and respective challenge response communications can be reduced to fewer messages if desired. For example, the link manager 140 can receive a request from the resource 160 to terminate the wireless communication link 128-1. The resource 160 may be programmed to include specific unique information such as the IP address of the resource, vendor specific information associated with the resource, etc., in the original request message. The link manager 140 can be configured to obtain data such as the unique information from the message. The data may be located in a predetermined data field of the termination request message. In response to detecting that the obtained data (such as the IP address, vendor specific information, etc.) in the received request to terminate message does not match the corresponding information in the map 355 computer device 150-1, the link manager 140 immediately denies the request to terminate the wireless communication link 128-1 by transmitting a respective denial message 325-4.

As an alternative instance, if the unique information in the predetermined data field of the request message does include unique information matching the corresponding information in the map 355, then the link manager 140 assumes that the message has been legitimately sent from the computer device 150-1 and grants the request to terminate the wireless communication link 128-1.

Accordingly, via prevention of denial of service attacks, the computer device 150-1 continues to use, with minimal or no disruption of service, the wireless communication link 128-1 and respective access point 105-1 to retrieve content over a network such as the Internet.

Figure 5:
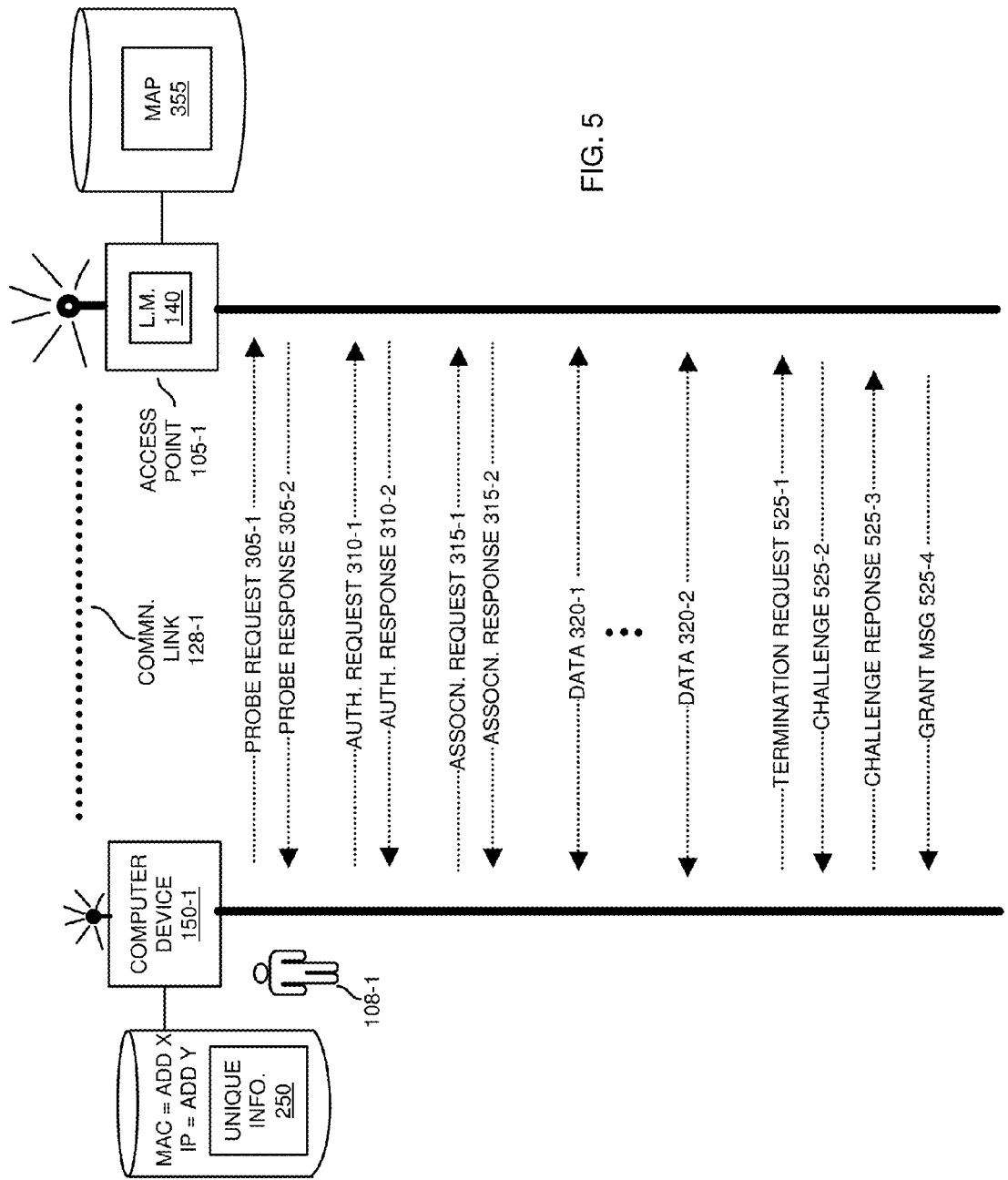
FIG. 5 is an example diagram illustrating communications to reduce occurrence of denial of service attacks according embodiments herein.

FIG. 5 is an example diagram illustrating an instance in which the computer device 150-1 attempts to terminate a respective wireless communication link according to embodiments herein.

As previously discussed, the computer device 150-1 communicates with the link manager 140 of the access point 105-1 to establish the wireless communication link 128-1.

In accordance with embodiments herein, the access point 105-1 utilizes any of one or more different types of unique information received from or associated with the computer device 150-1 and/or user 108-1 to verify authenticity of a subsequently received request to terminate the wireless communication link 128-1.

More specifically, assume that the computer device 150-1 generates a legitimate termination request 525-1 to terminate the wireless communication link 128-1. In one embodiment, the termination request 525-1 includes ADD X to indicate that the termination request 525-1 was generated and sent from the computer device 150-1. The link manager 140 of access point 105-1 receives the valid termination request 525-1 from computer device 150-1.

By way of a non-limiting example, in response to receiving the termination request 525-1, the link manager 140 transmits a challenge 525-2 to the computer device 150-1. In one embodiment, the challenge 525-2 includes a request for the recipient (e.g., computer device 150-1) to provide unique information to the link manager 140. As previously discussed, the challenge 525-2 may or may not specify the particular type of unique information that is being requested.

Assume in this example that the challenge request 525-2 includes a request for the computer device 150-1 to provide a copy of unique information (e.g., vendor specific information or any other suitable information) that was previously sent during the association process of establishing the wireless communication link 128-1.

The computer device 150-1 receives the challenge 525-2. In response to the request for unique information as indicated by the challenge 525-2, the computer device 150-1 forwards a copy of the unique information 250 associated with computer device 150-1 as the challenge response 525-3. The unique information 250 associated with computer device 150-1 is a duplicate copy of the unique information 250 previously forwarded to the access point 105-1 during the association process to establish wireless communication link 128-1.

Using map 355, the link manager 140 maps a network address (e.g., ADD X) in the messaging (e.g., challenge response 525-3) received from the computer device 150-1 to the stored unique information 250 in map 355. The link manager 140 obtains the requested challenge data (such as unique information 250) from the challenge response 525-3 and compares it to previously stored unique information 250 in map 355.

In this instance, based on the comparison, the link manager 140 detects that the computer device 150-1 attempting to terminate the wireless communication link 128-1 is a legitimate user or machine because the sender was able to provide the unique information 250 associated with the computer device 150-1.

Accordingly, in response to detecting that the data (e.g., unique information 250) obtained from the challenge response 525-3 is substantially the same or substantially the same as the unique information 250 in the map 355, the link manager 140 of the access point 105-1 grants the received request to terminate the wireless communication link 128-1. By way of a non-limiting example, the link manager 140 can be configured to generate and transmit the grant message 525-4 to computer device 150-1 to indicate that the request to terminate has been granted.

Figure 6:
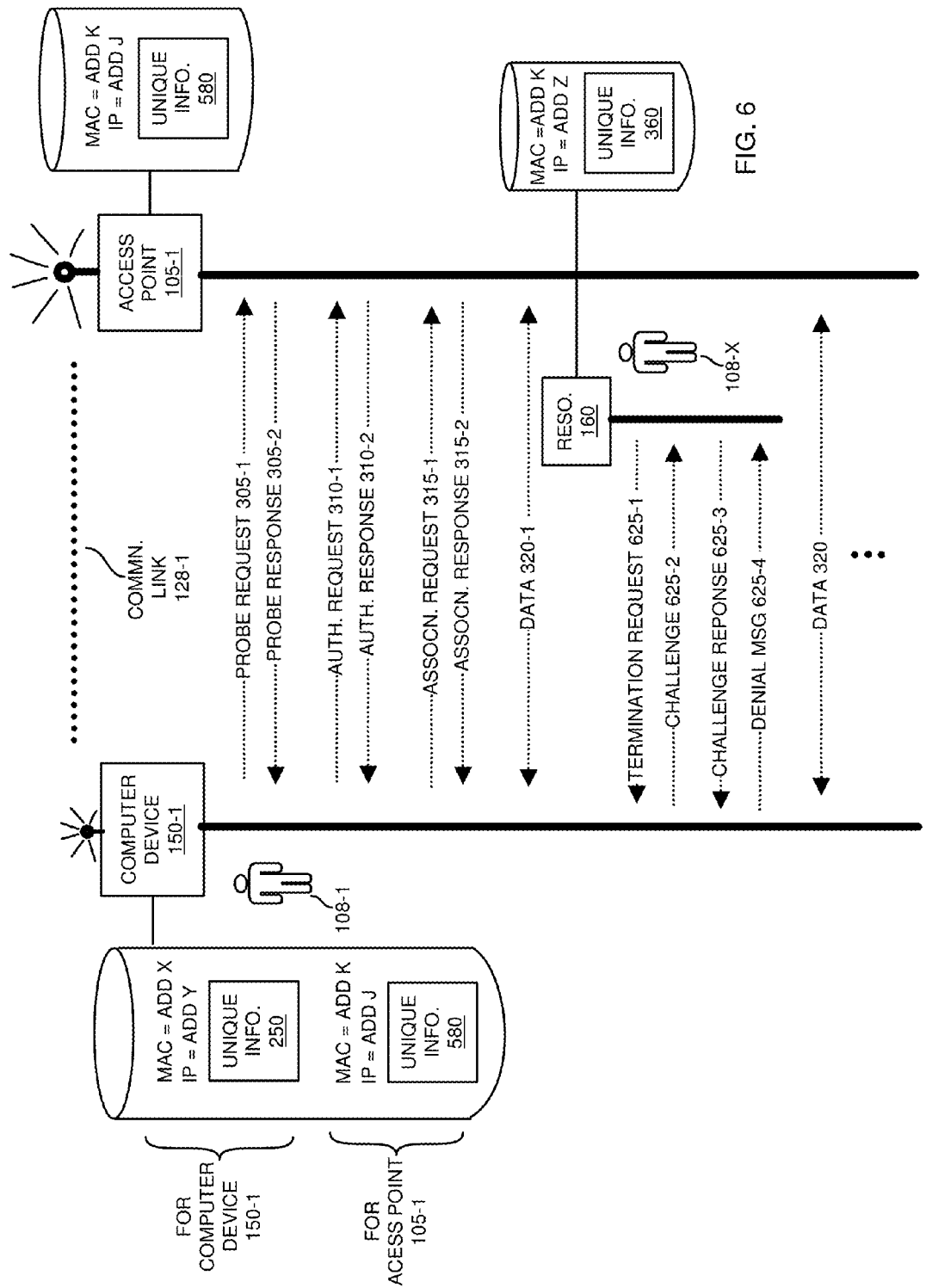
FIG. 6 is an example diagram illustrating communications to reduce occurrence of denial of service attacks according embodiments herein.

FIG. 6 is an example diagram illustrating communications to reduce occurrence of denial of service attacks according embodiments herein.

As previously discussed, the computer device 150-1 communicates with the link manager 140 of the access point 105-1 to establish the wireless communication link 128-1.

In this example embodiment, during the association process to establish the wireless communication link 128-1, the computer device 150-1 can be configured to receive unique information 580 associated with the wireless communication link 128-1. Unique information can be any suitable information such as vendor specific information, data rate information, software version information, etc., associated with the access point 105-1.

In this example, assume that the access point 105-1 is assigned unique network addresses MAC address ADD K and IP address ADD J. Communications from the access point 105-1 can include at least the MAC address to indicate that the source access point 105-1 is the source of the respective message. The computer device 150-1 stores any of the following information for the access point 105-1 such as the MAC address ADD K, IP address ADD J, unique information 580, etc.

Thus, embodiments herein can include, at the computer device 150-1 communicating with a publicly useable open wireless access point 105-1, receiving unique information associated with the wireless access point 105-1. The computer device 150-1 stores the unique information in a repository accessible to the computer device 150-1.

In one non-limiting example embodiment, the computer device 150-1 utilizes the unique information such as unique information 580, IP address ADD J, etc., to verify authenticity of a request to terminate the wireless communication link 128-1 by the access point 105-1.

In this example embodiment, assume that the resource 160 attempts to illegitimately terminate the wireless communication link 128-1 by spoofing the computer device 150-1 into believing that the access point 105-1 sends a message to terminate.

For example, assume in this example that the computer device 150-1 receives a message such as termination request 625-1 from resource 160 purporting to be the wireless access point 105-1. The message includes the request to terminate the wireless communication link. The message can include the MAC address ADD K and thus appear to be legitimately sent from the access point 105-1.

The computer device 150-1 communicates a challenge 625-2 to the resource 160 to verify authenticity of the request to terminate the wireless communication link 128-1. The challenge 625-2 can indicate to the resource 160 to provide a copy of unique information associated with the wireless access point 105-1. Recall that the computer device 150-1 stored unique information associated with the access point 105-1 during the association process.

In response to receiving the challenge message 625-2, the resource 160 generates and transmits a challenge response 625-3 to the computer device 150-1. The challenge response 625-3 can include unique information 360 and/or IP address ADD Z of the resource 160.

The computer device 150-1 receives a challenge response 625-3 from the resource 160. In a similar vein as discussed above, the computer device 150-1 compares the received unique information associated with the resource 160 to the previously stored information associated with the access point 105-1.

For example, the computer device 150-1 compares the information received from resource 160 and compares it to the previously received information and detects that they do not match. In response to detecting that information from the resource 160 such as information in the challenge response 625-3 does not include the copy of the expected unique information associated with the access point 105-1, the computer device 150-1 disregards and/or denies the request to terminate the wireless communication link 128-1. Denial can include transmitting a notification such as denial message 625-4 from the computer device 150-1 to the resource 160. The notification can indicate that the request to terminate has been denied.

The computer device 150-1 continues to use, with minimal or no disruption of service, the wireless communication link 128-1 and respective access point 105-1 to retrieve content over a network such as the Internet.

Figure 7:
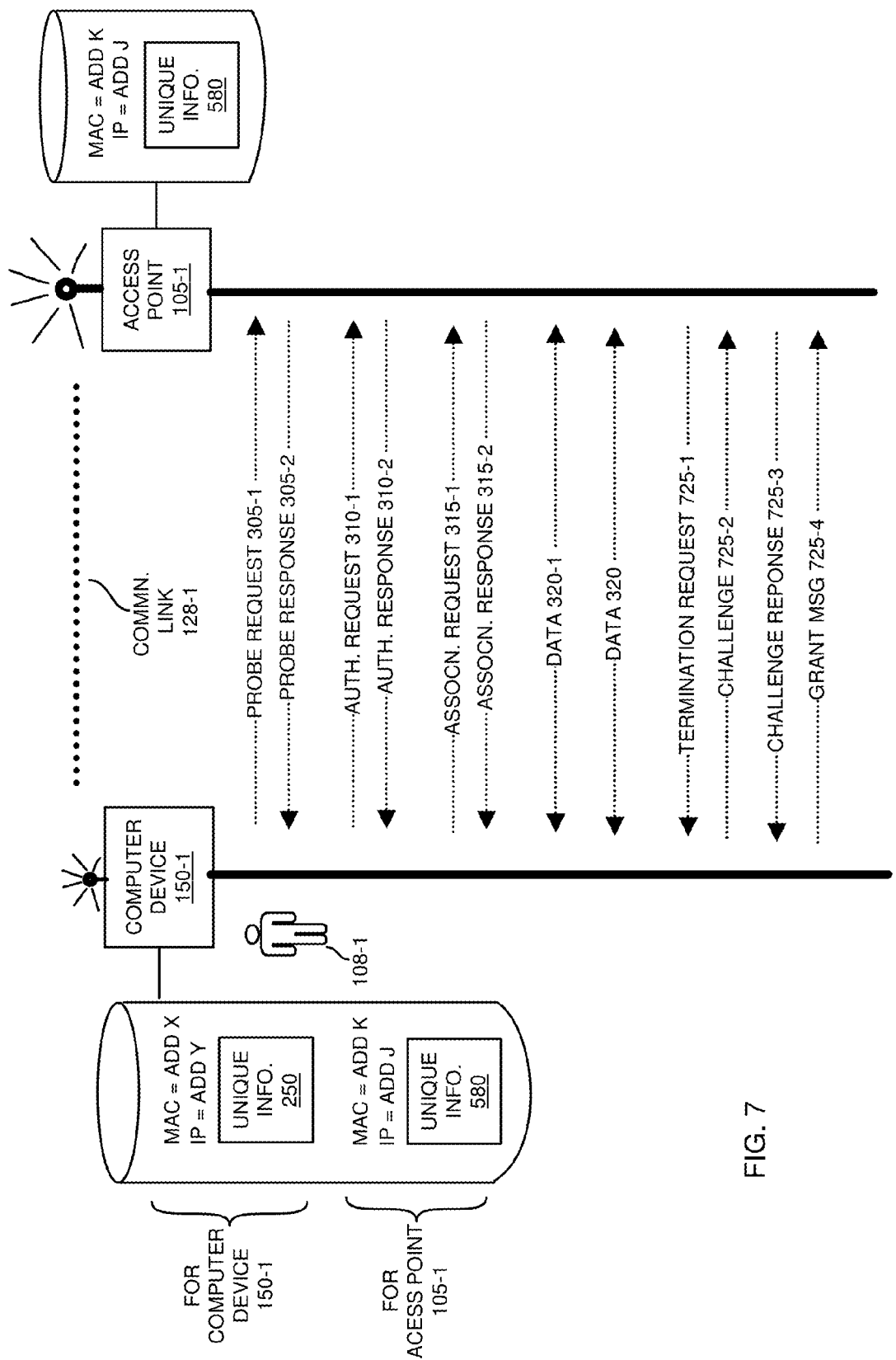
FIG. 7 is an example diagram illustrating communications to reduce occurrence of denial of service attacks according embodiments herein.

FIG. 7 is an example diagram illustrating communications to reduce occurrence of denial of service attacks according to embodiments herein.

As previously discussed, the computer device 150-1 communicates with the link manager 140 of the access point 105-1 to establish the wireless communication link 128-1.

In accordance with embodiments herein, as previously discussed, the computer device 150-1 utilizes any of one or more different types of unique information received from or associated with the access point 105-1 to verify authenticity of a subsequently received request to terminate the wireless communication link 128-1.

More specifically, assume that the access point 105-1 generates a legitimate termination request 725-1 to terminate the wireless communication link 128-1. In one embodiment, the termination request 725-1 includes ADD K to indicate that the termination request 725-1 was generated and sent from the access point 105-1. The computer device 150-1 receives the termination request 725-1 from the access point 105-1.

By way of a non-limiting example, in response to receiving the termination request 725-1, the computer device 150-1 transmits a challenge 725-2 to the access point 105-1. In one embodiment, the computer device 150-1 includes a request for the recipient (e.g., access point 105-1) of the challenge 725-2 to provide unique information to the computer device 150-1. The challenge 725-2 may or may not specify the particular type of unique information that is being requested by the computer device 150-1.

Assume in this example that the challenge request 725-2 includes a request for the access point 105-1 to provide a copy of unique information (e.g., vendor specific information, unique network address information, or any other suitable information) that was previously sent during the association process of establishing the wireless communication link 128-1.

The access point 105-1 receives the challenge 725-2. In response to the request for unique information as indicated by the challenge 725-2, the access point 105-1 forwards a copy of the unique information 580 (or other suitable information) associated with access point 105-1 as the challenge response 725-3. The unique information 580 associated with computer device 150-1 is a copy of the unique information 580 previously forwarded to the access point 105-1 during the association process.

In this example, the computer device 150-1 detects that the unique information 580 in the challenge response 725-3 matches the unique information 580 stored in the repository accessible to the computer device 150-1. Based on the positive result of the comparison, the computer device 150-1 detects that the termination request 725-1 has been legitimately sent from the access point 105-1.

Accordingly, in response to termination request 725-1, the computer device 150-1 grants the request to terminate the wireless communication link 128-1. By way of a non-limiting example, the computer device 150-1 can be configured to generate and transmit the grant message 725-4 to the access point 105-1 to indicate that the request to terminate has been granted and/or acknowledged.

Additional Embodiments

Referring again to FIG. 3 and other figures, note that the access point 105-1 is not limited to using unique information received from the computer device 150-1 during the corresponding association to verify the authenticity of a respective termination request. The access point 105-1 can receive and/or retrieve the unique information associated with the computer device 150-1 in any suitable manner.

By way of a non-limiting example, the wireless access point 105-1 can be openly accessible to public use. The network address of the computer device 150-1 can be transmitted from the computer device 150-1 to the access point during the establishing of the wireless communication link 128-1.

The wireless access point 105-1 can retrieve any suitable unique information associated with the computer device 150-1 and utilize the unique information as a basis to verify authenticity of a subsequent request to terminate the wireless communication link 128-1. As an example, assume that the access point 105-1 receives the termination request 325-1 from a resource 160 purporting to be the computer device 150-1. The request can include a network address assigned to the computer device 150-1. The access point 105-1 transmits a challenge 325-2 to the resource 160. The access point 105-1 receives a response to the challenge (e.g., challenge response 325-3) from the resource 160. The response 325-3 can include challenge response data produced and/or provided by the resource 160. The access point 105-1 compares the retrieved unique information associated with the computer device 150-1 to the challenge response data.

As an alternative to receiving the unique information during association as discussed above, in one embodiment, the access point 105-1 receives the unique information associated with the computer device 150-1 out-of-band with respect to a communication protocol of establishing the wireless communication link 128-1. For example, in one embodiment, the user 108-1 may provide the unique information associated with computer device 150-1 during a pre-registration step and prior to an attempt by the user 108-1 and/or computer device 150-1 to establish the wireless communication link 128-1.

The access point 105-1 can use the network address of the computer device 150-1 as an identifier to retrieve the unique information associated with the computer device 150-1. The unique information can be retrieved from a local repository or remotely located repository depending on where the unique information is stored.

In response to detecting that the challenge response data from the resource does not match the retrieved unique information associated with the computer device 150-1, the access point 105-1 disregards the request to terminate the wireless communication link 128-1.

Figure 8:
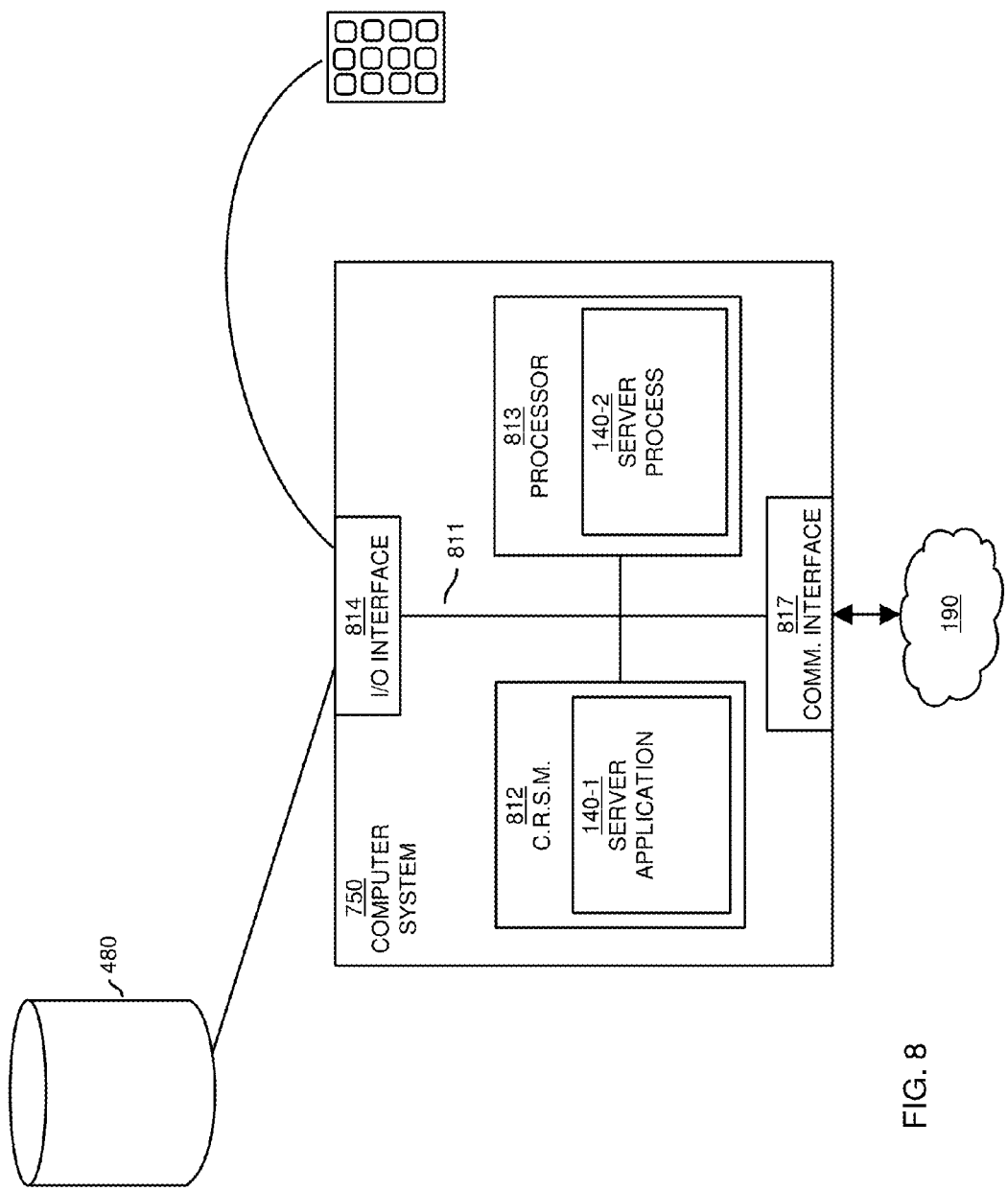
FIG. 8 is a diagram illustrating an example computer architecture in which to execute any of the functionality according to embodiments herein.

FIG. 8 is an example block diagram of a computer device for implementing any of the operations as discussed herein according to embodiments herein.

As shown, computer system 750 such as a computer device operated by the user, an access point 105-1, a server resource, a wireless access point, etc., of the present example can include an interconnect 811 that couples computer readable storage media 812 such as a non-transitory type of media (i.e., any type of hardware storage medium) in which digital information can be stored and retrieved, a processor 813 (e.g., one or more processor devices of hardware), I/O interface 814, and a communications interface 817.

I/O interface 814 provides connectivity to a repository 480 and, if present, other devices such as a playback device, display screen, keypad, a computer mouse, etc.

Computer readable storage medium 812 can be any hardware storage resource or device such as memory, optical storage, hard drive, floppy disk, etc. In one embodiment, the computer readable storage medium 812 stores instructions and/or data.

Communications interface 817 enables the computer system 150 and processor 813 to communicate over a resource such as network 190 to retrieve information from remote sources and communicate with other computers. I/O interface 814 enables processor 813 to retrieve stored information from repository 480.

As shown, computer readable storage media 812 is encoded with link manager application 140-1 (e.g., software, firmware, etc.) executed by processor 813. Link manager application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in link manager application 140-1 stored on computer readable storage medium 812.

Execution of the link manager application 140-1 produces processing functionality such as link manager process 140-2 in processor 813. In other words, the link manager process 140-2 associated with processor 813 represents one or more aspects of executing link manager application 140-1 within or upon the processor 813 in the computer system 150.

Those skilled in the art will understand that the computer system 150 can include other processes and/or software and hardware components, such as an operating system that controls allocation and use of hardware resources to execute link manager application 140-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 750 may reside at any location or can be included in any suitable resource in network environment 100 to implement functionality as discussed herein.

Functionality supported by the different resources will now be discussed via flowcharts in FIGS. 9-10. Note that the steps in the flowcharts below can be executed in any suitable order.

Figure 9:
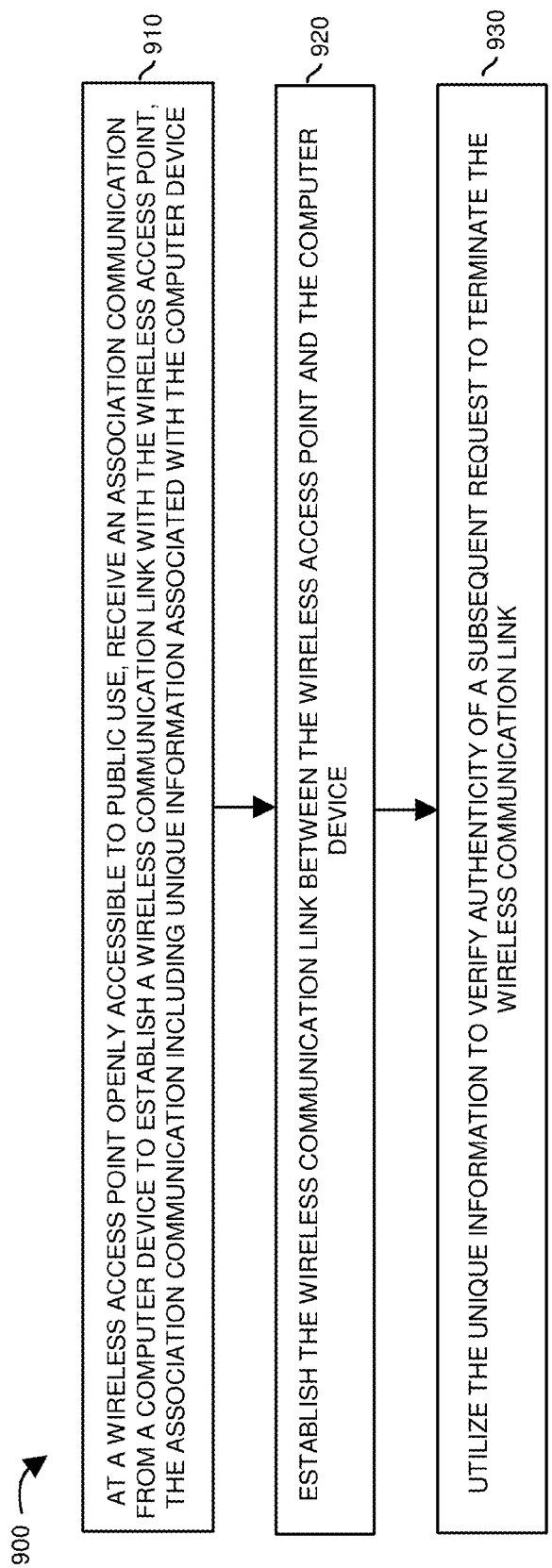
FIG. 9 is an example diagram illustrating a method of reducing denial of service attacks in a wireless network according to embodiments herein.

FIG. 9 is a flowchart 900 illustrating an example method according to embodiments. Note that there will be some overlap with respect to concepts as discussed above.

In processing block 910, the wireless access point 105-1 (which may be openly accessible to public use) receives an association communication from a computer device 150-1 to establish a wireless communication link 128-1 with the wireless access point 105-1. The association communication includes unique information associated with the computer device 150-1.

In processing block 920, the wireless access point 105-1 establishes the wireless communication link 128-1 between the wireless access point 105-1 and the computer device 150-1.

In processing block 930, the wireless access point 105-1 utilizes the unique information associated with the computer device 150-1 to verify authenticity of a subsequent request to terminate the wireless communication link 128-1.

Figure 10:
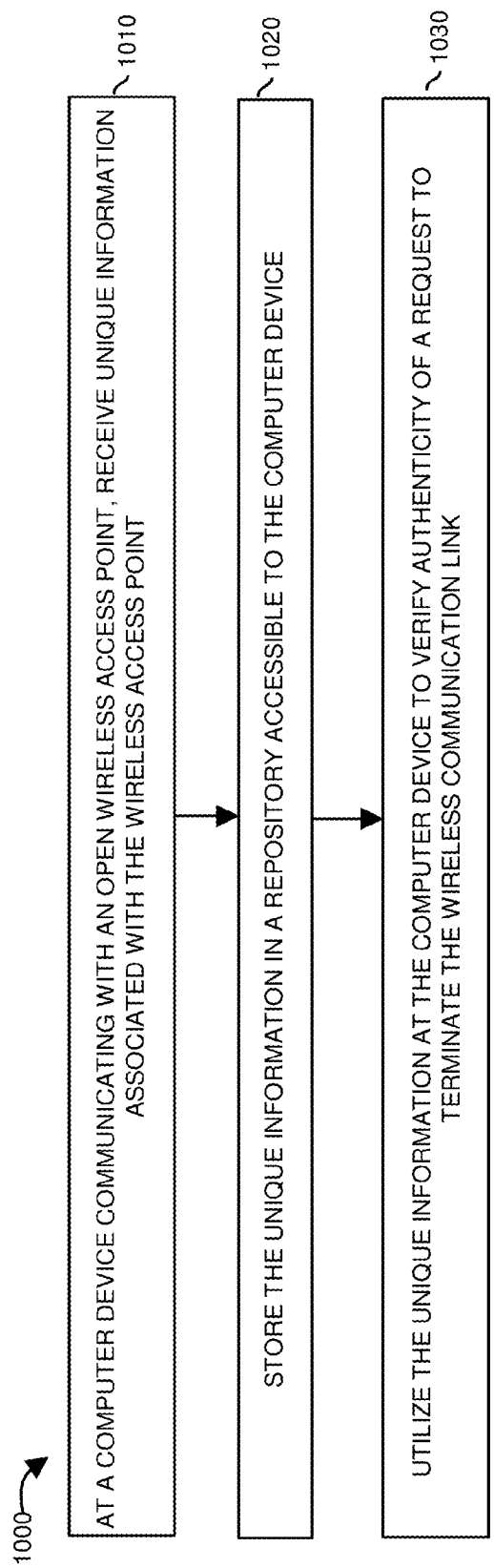
FIG. 10 is an example diagram illustrating a method of reducing denial of service attacks in a wireless network according to embodiments herein.

FIG. 10 is a flowchart 1000 illustrating an example method according to embodiments. Note that there will be some overlap with respect to concepts as discussed above.

In processing block 1010, computer device 150-1 communicating with an open wireless access point 105-1 receives unique information associated with the wireless access point 105-1.

In processing block 1020, the computer device 150-1 stores the unique information in a repository accessible to the computer device 150-1.

In processing block 1030, the computer device 150-1 utilizes the unique information to verify authenticity of a request to terminate the wireless communication link 128-1.

Note again that techniques herein are well suited for reducing denial of service attacks in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a wireless access point openly accessible to public use, receiving an association communication from a computer device to establish a wireless communication link with the wireless access point, the association communication including unique information associated with the computer device;
   establishing the wireless communication link between the wireless access point and the computer device; and
   utilizing the unique information received in the association communication to verify authenticity of a request to terminate the wireless communication link.

2. The method as in claim 1, wherein utilizing the unique information to verify authenticity of the request to terminate includes:
   receiving a message from a resource communicating with the wireless access point, the message including the request to terminate the wireless communication link, the message purporting to be sent from the computer device; and
   communicating a challenge message to the resource, the challenge message requesting the resource to provide a copy of the unique information associated with the computer device.

3. The method as in claim 2, wherein utilizing the unique information to verify authenticity of the request to terminate further includes:
   receiving a challenge response from the resource, the resource generating the challenge response in response to receiving the challenge message; and
   in response to detecting that the challenge response includes the copy of the unique information associated with the computer device, granting the request to terminate the wireless communication link.

4. The method as in claim 3, wherein the resource is the computer device, the method further comprising:
   transmitting a notification to the resource, the notification indicating that the request to terminate has been granted.

5. The method as in claim 3, wherein the resource is not the computer device; and
   wherein utilizing the unique information to verify authenticity of the request to terminate further includes:
   receiving a challenge response from the resource, the resource generating the challenge response in response to receiving the challenge message;
   in response to detecting that the challenge response does not include the copy of the unique information associated with the computer device, denying the request to terminate the wireless communication link.

6. The method as in claim 1 further comprising:
   obtaining a unique network address assigned to the computer device;
   storing the unique network address in a repository;
   storing the unique information in the repository; and
   producing a mapping between the unique information and the unique network address.

7. The method as in claim 6 further comprising:
   receiving the request from a resource purporting to be the computer device;
   transmitting a challenge to the resource; and
   receiving a response to the challenge from the resource.

8. The method as in claim 6 further comprising:
   mapping an address of the resource purporting to be the computer device to the unique information in the repository;
   obtaining data from the response to the challenge;
   comparing the data in the response to the unique information in the repository; and
   granting the request to terminate the wireless communication link in response to detecting that the data obtained from the response is substantially identical to the unique information in the repository.

9. The method as in claim 6 further comprising:
   mapping an address of the resource purporting to be the computer device to the unique information in the repository;
   obtaining data from the response to the challenge;
   comparing the data in the response to the unique information in the repository; and
   denying the request to terminate the wireless communication link in response to detecting that the data obtained from the response is substantially different than the unique information in the repository.

10. The method as in claim 1, wherein the unique information is an IP address assigned to the computer device.

11. The method as in claim 1, wherein the unique information is vendor specific information associated with the computer device.

12. The method as in claim 1, wherein utilizing the unique information to verify authenticity of the request to terminate includes:
receiving a message from the computer device over the wireless communication link, the message including the request to terminate the wireless communication link;
obtaining data from the message; and
in response to detecting that the obtained data matches the unique information in the received association communication, granting the request to terminate the wireless communication link.

13. The method as in claim 1, wherein utilizing the unique information to verify authenticity of the request to terminate includes:
receiving a communication transmitted to the wireless access point, the message including the request to terminate the wireless communication link;
obtaining data from the message; and
in response to detecting that the obtained data does not match the unique information in the received association communication, denying the request to terminate the wireless communication link.

14. The method as in claim 1, wherein utilizing the unique information includes: i) retrieving the unique information, and ii) comparing data in the request to the retrieved unique information to verify authenticity of the request.

15. The method as in claim 1, wherein utilizing the unique information to verify authenticity of the request to terminate includes:
receiving a message from a resource purporting to be the computer device, the message including the request to terminate the wireless communication link; and
utilizing an identity of the computer device to retrieve the unique information.

16. The method as in claim 15, wherein utilizing the unique information to verify authenticity of the request to terminate further includes:
comparing the retrieved unique information to data received in the message received from the resource to verify the authenticity of the request.

17. A method comprising:
establishing a wireless communication link between a wireless access point and a computer device; and
at the wireless access point:
retrieving unique information associated with the computer device;
utilizing the unique information to verify authenticity of a request to terminate the wireless communication link.

18. The method as in claim 17, wherein utilizing the unique information to verify authenticity of the request includes:
receiving the request from a resource purporting to be the computer device, the request including a network address assigned to the computer device;
transmitting a challenge to the resource;
receiving a response to the challenge from the resource, the response including challenge response data produced by the resource; and
comparing the retrieved unique information with the challenge response data.

19. The method as in claim 18 further comprising:
in response to detecting that the challenge response data from the resource does not match the retrieved unique information associated with the computer device, disregarding the request to terminate the wireless communication link.

20. The method as in claim 19 further comprising:
receiving the unique information associated with the computer device out-of-band with respect to a communication protocol of establishing the wireless communication link; and
wherein the wireless access point is openly accessible to public use, the network address of the computer device transmitted from the computer device to the access point during the establishing of the wireless communication link.

21. The method as in claim 17 further comprising:
receiving the request from a resource purporting to be the computer device, the request including an indentifier assigned to the computer device.

22. The method as in claim 21, wherein the wireless access point provides wireless connectivity to multiple computer devices, the method further comprising:
receiving the unique information from the computer device during the establishing of the wireless communication link;
storing the unique information; and
wherein utilizing the unique information includes: i) retrieving the unique information, and ii) matching data in the request to the retrieved unique information to verify authenticity of the request.

23. A computer system comprising:
at least one processor device; and
a hardware storage resource coupled to the at least one processor device, the hardware storage resource storing instructions that, when executed by the at least one processor device, causes the at least one processor device to perform operations of:
receiving an association communication from a first computer device to establish a wireless communication link with a second computer device, the association communication including unique information associated with the first computer device;
establishing the wireless communication link between the first computer device and the second computer device; and
utilizing the unique information to verify authenticity of a request to terminate the wireless communication link.

24. The computer system as in claim 23, wherein utilizing the unique information to verify authenticity of the request to terminate includes:
receiving a message from a resource communicating with the second computer device, the message including the request to terminate the wireless communication link, the message purporting to be sent from the first computer device; and
communicating a challenge message to the resource, the challenge message requesting the resource to provide a copy of the unique information associated with the first computer device.

25. The computer system as in claim 24, wherein utilizing the unique information to verify authenticity of the request to terminate further includes:
receiving a challenge response from the resource, the resource generating the challenge response in response to receiving the challenge message; and in response to detecting that the challenge response includes the copy of the unique information associated with the first computer device, granting the request to terminate the wireless communication link;

wherein the resource is the computer device, the at least one processor device further performing operations of:
transmitting a notification to the resource, the notification indicating that the request to terminate has been granted.

26. The computer system as in claim 23, wherein the resource is not the first computer device; and wherein utilizing the unique information to verify authenticity of the request to terminate further includes:
receiving a challenge response from the resource, the resource generating the challenge response in response to receiving the challenge message;
in response to detecting that the challenge response does not include the copy of the unique information associated with the first computer device, denying the request to terminate the wireless communication link.

\* \* \* \* \*